Nov. 7, 1961      I. NEUSTADTER      3,007,246
TOOTH AND BAND UNITS FOR DENTAL RESTORATIONS
Filed March 1, 1957      3 Sheets-Sheet 1

INVENTOR.
Irving Neustadter
BY
ATTORNEYS

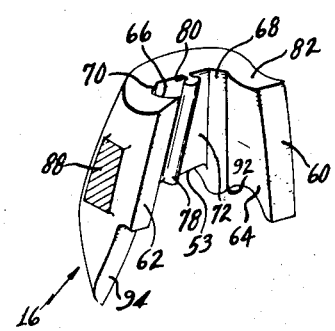
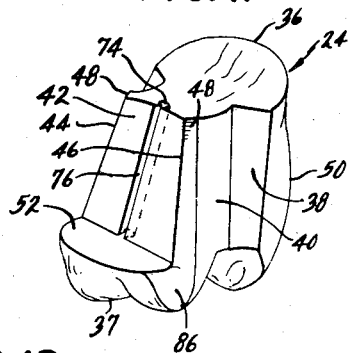
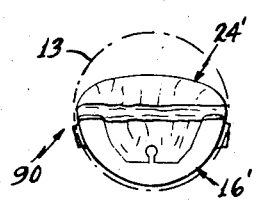
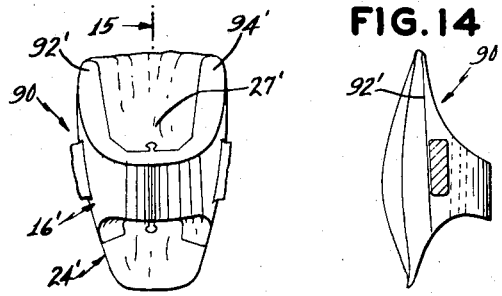
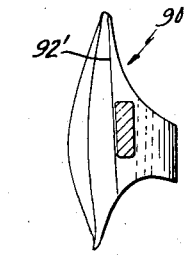
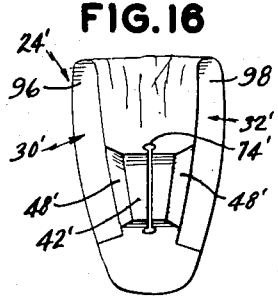
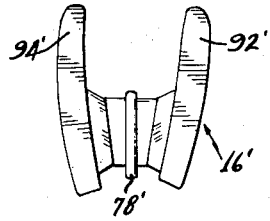
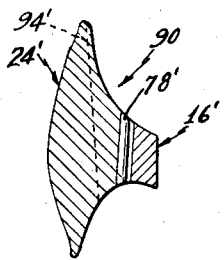
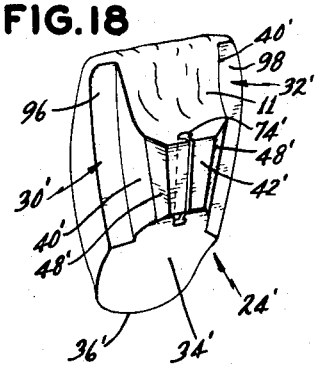
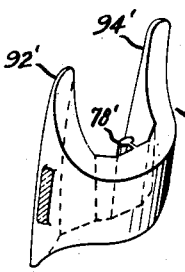

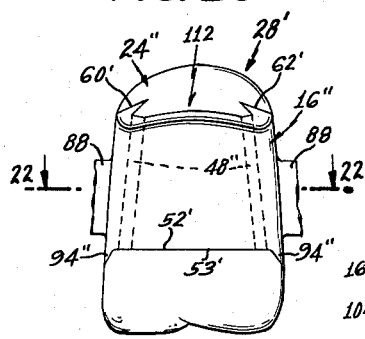
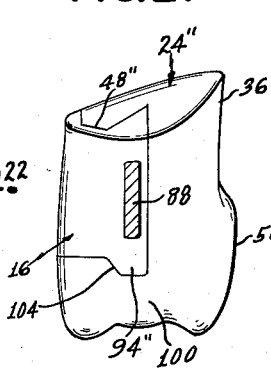
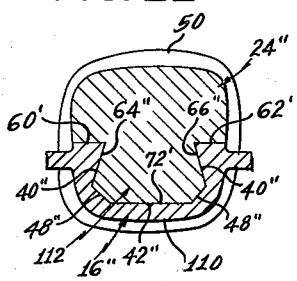
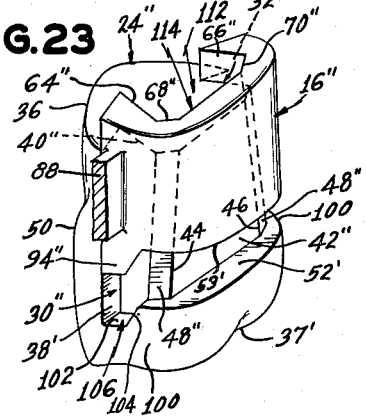
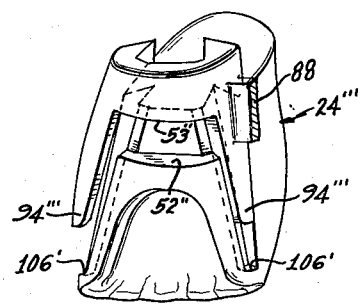
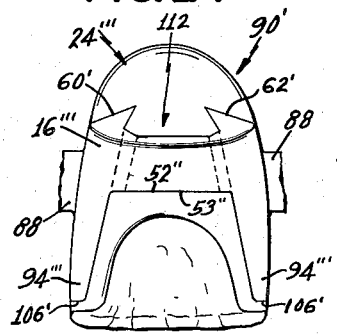
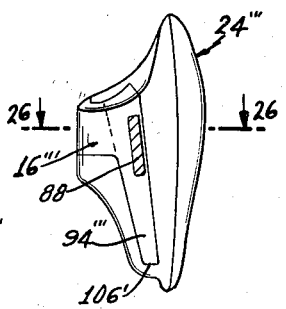
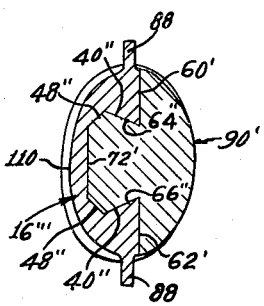

United States Patent Office 3,007,246
Patented Nov. 7, 1961

3,007,246
TOOTH AND BAND UNITS FOR
DENTAL RESTORATIONS
Irving Neustadter, 246 Bay 19th St., Brooklyn, N.Y.
Filed Mar. 1, 1957, Ser. No. 643,304
12 Claims. (Cl. 32—9)

This invention relates generally to dental restorations and, more particularly, to tooth and band units for dental restorations.

The primary aim and object of the present invention is the provision of a restoration tooth and band assembly wherein the tooth body and the band for the support thereof are constructed to obtain maximum strength of the assembly. Pursuant to this object of the present invention, the contacting interfitting surfaces of the tooth and band are constituted by planar surfaces whereby to provide increased strength of the restoration assembly and the components thereof. A feature which contributes to the increased strength of the tooth body is the provision of planar vertical surfaces between the lingual surface of the tooth body and the mesial and distal surfaces thereof, with the corresponding portions of the band being accordingly strengthened.

Another object of the present invention is the provision of a restoration tooth and band assembly which may be economically mass produced utilizing conventional methods and apparatus.

Another object of the present invention is the provision of a restoration tooth and band assembly wherein the band provides maximum support for the tooth body with a minimum of band contact with the gum tissue.

Another object of the present invention is the provision of a restoration tooth and band assembly in which there is provided maximum retention therebetween in a lingual to labial or buccal direction.

Yet another object of the present invention is the provision of a generally improved restoration tooth and band assembly.

The above and other objects, features and advantages of the present invention will be more fully understood from the following description considered in connection with the accompanying illustrative drawings.

In the drawings which illustrate the best modes now contemplated by me for carrying out my invention;

FIG. 10 is a rear perspective view of the band unit;

FIG. 11 is a rear perspective view of the restoration tooth unit;

FIG. 12 is a plan view of an anterior tooth and band assembly and is an enlargement of encircled area 13 of FIG. 2;

FIG. 13 is a rear elevational view thereof;

FIG. 14 is a side elevational view thereof;

FIG. 15 is a sectional view taken on the line 15—15 of FIG. 13;

FIG. 16 is a rear elevational view of the tooth unit of the assembly shown in FIGS. 12, 13 and 14;

FIG. 17 is a rear elevational view of the band unit of the assembly shown in FIGS. 12, 13 and 14;

FIG. 18 is a rear perspective view of the tooth unit shown in FIG. 16;

FIG. 19 is a front perspective view of the band unit shown in FIG. 17;

FIG. 20 is a view similar to FIG. 5 and illustrates an additional embodiment of the invention;

FIG. 21 is a side elevation of the assembly shown in FIG. 20;

FIG. 22 is a sectional view taken on the line 22—22 of FIG. 20;

FIG. 23 is a partially exploded view of the assembly illustrated in FIGS. 20, 21 and 22;

FIG. 24 is a view similar to FIG. 13 and illustrates the additional embodiment of the invention as applied to an anterior tooth and band assembly;

FIG. 25 is a side elevation of the assembly illustrated in FIG. 24;

FIG. 26 is a sectional view taken on the line 26—26 of FIG. 25; and

FIG. 27 is a partially exploded view of the assembly illustrated in FIGS. 24, 25 and 26.

Figure 1:
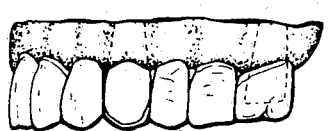
FIG. 1 is an elevational view of an upper posterior dental restoration, formed according to the present invention, shown positioned in the patient's jaw.
Figure 2:
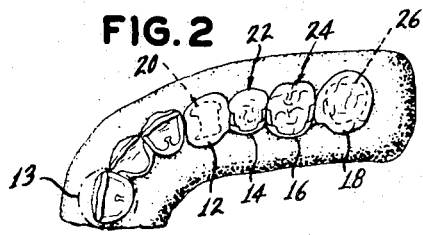
FIG. 2 is a plan view thereof.
Figure 3:
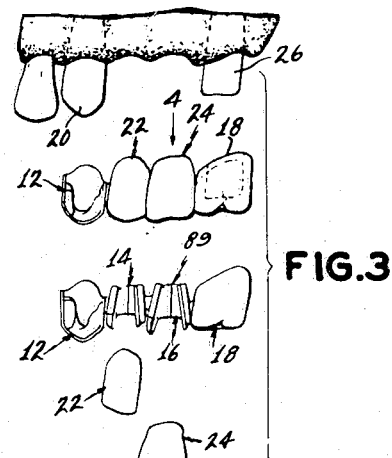
FIG. 3 is a view similar to FIG. 1 showing the dental restoration in exploded form.
Figure 4:
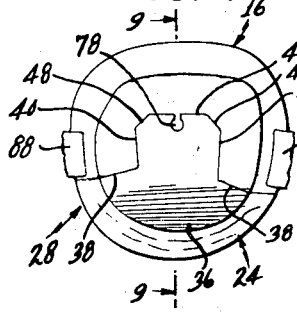
FIG. 4 is an enlarged plan view of a posterior tooth and band assembly looking in the direction of arrow 4 in FIG. 3.
Figure 5:
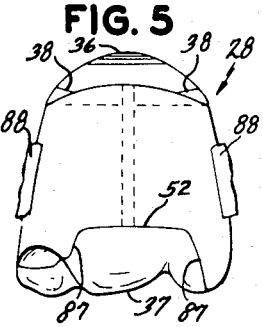
FIG. 5 is a rear elevational view thereof.
Figure 6:
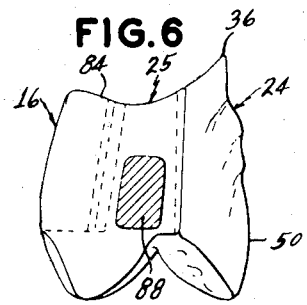
FIG. 6 is a side elevational view thereof.
Figure 7:
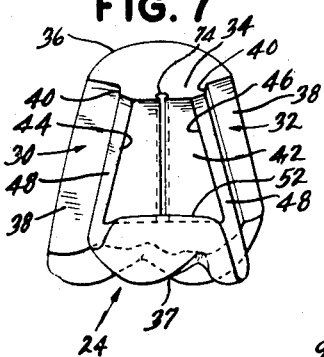
FIG. 7 is a rear elevational view of the restoration tooth unit of the assembly shown in FIGS. 4, 5 and 6.
Figure 9:
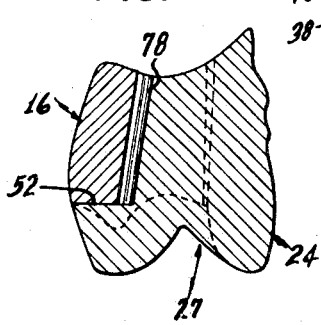
FIG. 9 is a sectional view taken on the line 9—9 of FIG. 4.
Figure 8:
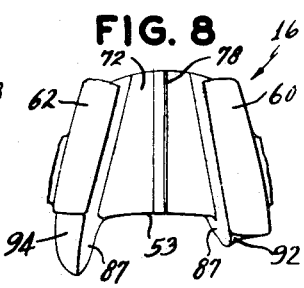
FIG. 8 is a rear elevational view of the band unit of the assembly shown in FIGS. 4, 5 and 6.

Referring to the drawings, and more particularly to FIGS. 1 through 11 thereof, there is shown in FIGS. 1–3 by way of example an upper posterior restoration 10 positioned in the patient's jaw, said restoration comprising a plurality of interconnected frame or band units 12, 14, 16 and 18, the end band units 12 and 18 constituting abutments of any suitable design and construction for the support of the restoration in the patient's jaw, it being understood that said abutments may be of any desired form depending on the preference of the dentist. Each of the abutments 12 and 18 is adapted to be mounted to a complementary prepared tooth 20 and 26, respectively, and each of the band units 14 and 16 is adapted to mount and support a complementary tooth unit 22 and 24, respectively, the restoration tooth and band assembly 28, to be hereinafter described in detail as an example of a posterior assembly formed pursuant to the present invention, being constituted by the band unit 16 and its companion restoration tooth unit 24. The restoration tooth and band assembly 28 of the restoration 10, will now be described in detail.

The restoration tooth unit 24, which is adapted to interfit with its complementary supporting band unit 16, is in the form of a tooth-shaped body and is provided with mesial and distal recessed portions 30 and 32, respectively, which are open at the outer lingual side 34 of the tooth unit and closed at the buccal side 36 thereof, said recessed portions being constituted by planar surfaces, as will be described in detail hereinafter, which extend vertically in a gingival to occlusal direction and laterally in a mesial-distal direction. Each of the recessed portions 30 and 32 comprises a vertical shoulder 38 which extends in a mesial-distal direction and a vertical shoulder 40 which extends in a buccal-lingual direction, said vertical shoulders 38 and 40 being constituted by planar surfaces. The tooth-shaped body or tooth unit 24 has a planar wall 42 at its lingual side 34 which extends laterally between the recessed portions 30 and 32, and also vertically in a gingival to occlusal direction. The planar wall 42 terminates in opposite edges 44 and 46 which define the inner lateral boundaries of the recessed portions 30 and 32, respectively, it being noted that said recessed portions include planar vertical corner portions 48. Thus, the vertical shoulders 40 and the adjacent edge 44, 46 of the planar wall 42 are interconnected by planar corner portions 48 which are disposed at the lingual side of the tooth and extend vertically to a gingival to occlusal direction. The vertical recessed portions 30 and 32 are thus constituted by planar surfaces which extend from the gingival edge 36 of the tooth unit to the occlusal edge 37 thereof. The vertical shoulders 40 of the tooth-shaped body 24 converge towards the gingival edge 36 of said body in a gingival to occlusal direction and also converge towards the buccal side 50 of said body in a buccal-lingual direction for a purpose which will be described in detail hereinafter. The lingual planar wall 42 tapers towards the gingival edge 36 of the tooth-shaped body 24 and said planar wall terminates in a planar horizontal shoulder 52 which is spaced from the occlusal edge 37 of said body. The horizontal shoulder 52 extends between the edges 44 and 46 which define the inner lateral boundaries of the recessed portions 30 and 32, respectively, and thus said horizontal shoulder is of substantial length in a mesial-distal direction. The horizontal shoulder 52 is also of substantial width or thickness in a buccal-lingual direction and said shoulder is adapted to interfit with complementary structure of its supporting band unit 16 as will be described in detail hereinafter. The recessed portions 30 and 32, the planar wall 42 and its terminal shoulder 52 are thus all constituted by planar surfaces which define the contacting surfaces which are adapted to interfit with complementary planar surfaces of the supporting band unit 16.

The supporting frame or band unit 16 of the restoration assembly 28 is of generally U-shaped configuration and is provided with internal planar wall surfaces which are adapted to abut and interfit with companion planar surfaces of its complementary tooth-shaped body 24. The terminal edges or vertical shoulders 60 and 62 of the band unit 16 are constituted by planar surfaces which are adapted to contact and interfit with the vertical shoulders 38 of the recessed portions 30 and 32, respectively. The internal vertical wall surfaces 64 and 66 are constituted by planar surfaces which are adapted to contact and interfit with the vertical shoulders 40 of the recessed portions 30 and 32, respectively. The band unit 16 is provided with vertical planar corner surfaces 68 and 70 which are formed complementary to the vertical corner portions 48 of unit 24 and are similarly adapted to abut the same and interfit therewith. The tapered inner planar wall 72 is formed complementary to its companion wall 42 of the tooth unit 24 and interfits therewith in the assembled conditions of units 16 and 24.

Defined in the planar wall 42 of the tooth unit 24 is a vertically extending circular groove 74 which extends from the gingival edge 36 of the tooth unit to the horizontal shoulder 52 thereof, there being provided a vertical communicating slot 76 for said groove which extends from the latter to the planar wall 42. Thus the groove 74 extends for the length of the wall 42 and is disposed substantially medially of said wall in a gingival to occlusal direction. Projecting inwardly from the planar wall 72 of the band unit 16 is a vertical retention tongue 78 which interfits with its companion groove 74 in the assembled condition of the tooth and band unit. The tongue 78 includes a neck part 80 which interfits with the communicating slot 76 defined in the planar wall 42 of the tooth unit 24. The horizontal shoulder 53 of the unit 16 is formed complementary to its companion shoulder 52 of unit 24 and interfits therewith in the assembly of said units.

The gingival edge 82 of the band unit 16 collectively defines with the gingival edge 36 of the tooth unit 24 the gingival edge 25 of the assembly 28, it being noted that only a small portion of said gingival edge 25 of the assembly 28 is constituted by portions of the band unit 16 and accordingly only a small part of the band unit contacts the patient's gum. Thus, no part of the band unit 16 overlies the gingival edge 36 of the tooth unit 24 and accordingly, the major surface area of gingival edge 25 of the assembly 28 is constituted by surface portions of the tooth unit 24 of said assembly. It will be noted that the occlusal edge portions 84 of the band unit 16 collectively define with the occlusal edge 37 of the tooth unit 24 the occlusal edge 27 of the assembly 28, said edge portions 84 defining mesial and distal occlusal edge portions of the assembly 28. The planar surface portions 86 of the recessed portions 30 and 32 form continuations of the corner surfaces 48 and extend from the region of the horizontal shoulder 52 to the occlusal edge 37 of tooth unit 24. The band unit 16 is provided with internal planar surfaces 87 which are formed complementary to the surface portions 86 and interfit therewith. Thus, all of the internal tooth contacting wall surfaces of the band unit 16 are constituted by planar surfaces and interfit with correspondingly formed planar surfaces of its companion tooth unit 24 whereby to form an assembly 28 of maximum strength. The frame or band units 14 and 16 may be secured to each other and to the abutments 12 and 18 in any suitable manner, for example by means of a soldering operation or the like, as indicated at 88 to form the restoration frame 89. It will be apparent that, if desired, the restoration 10 may be fixedly or removably secured to the patient's jaw in any desired manner using abutment means in accordance with the dentist's preference. Any number of unit assemblies may be utilized to form the restoration 10, the specific restoration herein illustrated and described being given by way of example only. It will be understood that while the posterior tooth assembly 28 is a molar tooth restoration, the invention herein is fully applicable to the restoration of any tooth, including bicuspid teeth.

With reference to FIGS. 12 through 19, there is shown an anterior tooth and band assembly 90 which corresponds in all respects to the posterior assembly 28 described above in detail except in the respects to be pointed out in detail hereinafter. The features described above in detail with reference to the assembly 28 are applicable to the assembly 90 except for variations which will be apparent from the description which follows, it being understood that the specific restoration assemblies illustrated and described herein are given by way of example only. In the case of the assembly 90 it will be noted that the groove 74' and its companion interfitting tongue 78' are exposed at the incisal edge 27' of the assembly, it being understood that, if desired, said tongue and groove may be terminated at a point spaced from said incisal edge in the manner illustrated and described with reference to the restoration assembly 28. In this connection, it will be noted that assembly 90 is not provided with horizontal interfitting shoulders corresponding to the shoulders 52 and 53 of the assembly 28. The spaced vertically projecting portions 92' and 94' of the band unit 16' correspond generally to the portions 92 and 94 of band unit 16 and interfit with companion portions 96 and 98 of the recessed portions 30' and 32', respectively. It will therefore be apparent that the anterior restoration tooth and band assembly 90 comprises a band unit 16' having the tooth-shaped body 24' mounted thereon and supported thereby, said body and band having their interfitting contacting surfaces constituted by planar surfaces in the manner described above in detail so as to provide a restoration tooth unit 24' has mesial and distal recessed portions 30' and 32' which are open at the outer lingual side 34' of the tooth and closed at the labial side 36' thereof, said recessed portions being constituted by planar surfaces which are formed complementary to companion planar surfaces of the frame unit 16' and which extend vertically in a gingival to incisal direction and laterally in a mesial-distal direction. It will be understood that the teeth units 24, 24' may be formed of porcelain or any other material suitable for the formation and use thereof and that the frame or band units 16, 16' may be formed of precious metal or any other material suitable for the formation of such band or frame units.

It will be apparent from the above that all of the interfitting contacting surfaces of the tooth and band units are constituted by flat or planar surfaces whereby to provide a restoration assembly of maximum strength. The provision of planar inner surfaces on the band units and the elimination of curved surfaces thereat increases the resistance of the band units to resist the forces which act on the tooth body and on the band units during the use of the restoration assembly in the mouth, especially the forces which tend to spread the mesial and distal portions of the band units apart which in turn tends to bend or stress and thereby ultimately fracture the medial-lingual portion of the band units. A feature which contributes to the strength of the restoration assemblies described above is the provision on the tooth body of the recessed portions 30, 30' and 32, 32' which are constituted by planar vertically extending surfaces which extend between the lingual surfaces of the tooth body and the mesial and distal surfaces thereof, this construction and arrangement materially contributing to the strength of the teeth units and their supporting band units. The provision of the flat or planar complementary interfitting surfaces on the tooth and band units enable such units to be manufactured relatively economically utilizing simple conventional methods and apparatus. Thus the simplest grinding operations and apparatus may be utilized for forming such interfitting planar surfaces whereby the tooth and band assemblies described above may be economically mass produced.

The supporting band units furnish maximum support for the tooth body with minimum contact of portions of the band unit with the gum tissue. More particularly, this is accomplished in the manner described above wherein the entire support for the tooth body furnished by the supporting band unit is provided by the complementary planar surfaces of the band above the gingival line. The support for the tooth unit is provided by the converging mesial and distal inner planar surfaces 64, 68 and 66, 70, respectively, of the band unit in the case of both the anterior and posterior restoration assemblies and also by the planar horizontal shoulder 52 in the case of posterior restoration assemblies, said planar surfaces interfitting with companion planar surfaces of the tooth unit supported thereby. The band and tooth unit assemblies as thus constructed provide maximum retention therebetween in a lingual to labial or buccal direction. To this end the mesial and distal vertical shoulders 40 of the tooth units converge towards each other in a lingual to labial or buccal direction and the corresponding mating surfaces of the band units correspondingly converge towards each other in said direction. In addition, the retention tongue and groove at the lingual side of the restoration assemblies, as described in detail above, substantially increases the retention between the tooth and band units in a lingual to labial or buccal direction. Thus, there is provided maximum retention between the tooth and band units of the restoration assemblies in a lingual to labial or buccal direction as well as in a gingival to incisal or occlusal direction.

Referring now to FIGS. 20 through 23 in detail, there is illustrated the presently preferred embodiment of the invention as applied to a posterior tooth and band assembly. As here shown, the restoration tooth and band assembly 28', which may be used in the restoration 10, in the same manner as the previously described restoration tooth and band assembly 28, comprises the restoration tooth unit 24", which is adapted to interfit with its complementary supporting band unit 16", corresponds in all respects to the previously described tooth unit 24, except in the respects to be pointed out in detail hereinafter. In this connection, it will be noted that the tooth unit 24" is provided with the mesial and distal recess portions 30" and 32", respectively, which are open at the lingual side of the tooth unit and closed at the buccal side 36 thereof.

In the present embodiment, the planar wall 42", at the lingual side of the tooth unit, which extends laterally between the recessed portions 30" and 32", is a continuous wall and is not provided with the previously described groove 78. As in the restoration unit 28, planar corner or bevelled portions 48" interconnect the vertical shoulders 40"—40" and the adjacent edges 44, 46 of the planar wall. Said vertical shoulders converge or taper towards the gingival edge 36 of said body in an occlusal to gingival direction and also converge towards the buccal side 50 of said body in a lingual to buccal direction. The lingual planar wall 42" tapers toward the gingival edge 36 of the tooth-shaped body 24" and said planar wall terminates in the planar horizontal shoulder 52' which is spaced from the occlusal edge 37' of said body. Consequently, it will be apparent, that as in the prior embodiments, there is provided at the lingual or rear side of the tooth, a formation, constituted by the recesses 30" and 32", the bevelled corners 48" and the planar wall 42", which defines a tenon 112, which tenon tapers in a lingual to buccal direction, as best seen in FIG. 22, and which also tapers in an occlusal to gingival direction, from the shoulder 52', as best seen in FIG. 23.

Pursuant to a feature of the present embodiment, the shoulder 52' extends beyond the edges 44 and 46, which define the inner lateral boundaries of the recessed portions 30" and 32", respectively. More specifically, the shoulder 52' curves at each side of the tooth unit, in a buccal direction, as indicated at 100—100 in FIG. 23, so as to decrease the gingival-occlusal extent of the bevelled portions 48", from the corresponding bevelled portions 48 of the tooth unit 24, as will be readily apparent. It will be noted that each portion 100 continues toward the buccal surface 50 of the tooth and merges therewith. Consequently, it will be apparent that the curved portions 100 extend at the mesial and distal sides of the tooth unit 24" from the shoulder 52', at the lingual side thereof, to the buccal side 50 thereof, and that said portions 100 close or terminate the recesses 30" and 32" in spaced relation from the occlusal edge 37 of the tooth unit 24". In this connection, it will be noted that there is defined in each portion 100, a horizontal step or shoulder 102 which extends in a buccal-lingual direction, at each side of the tooth unit, between the planar surface 38' of the associated recess 30" and 32", as the case may be, and a surface 104 of each portion 100 which extends obliquely in a gingival-occlusal direction. While FIG. 23 illustrates the construction which defines the steps or shoulders 102 and 104 associated with the extended portion 100 of the shoulder 52' at the recess 30", it will be understood that the similar shoulders 102 and 104 are provided at the other side of the tooth at the occlusal end of the recess 32".

The supporting frame or band unit 16" of the restoration assembly 28' is substantially similar to the previously described band unit 16 of the restoration assembly 28. However, it will be noted that the tapered inner planar wall 72', which is formed complementary to the companion wall 42" of the tooth unit 24" is devoid of the previously described tongue 78 and that the gingival-occlusal extent thereof is less than the similar extent of the band unit 16. More specifically, in the present embodiment the band unit 16" does not extend to the occlusal surface of the tooth unit 24" and forms no part of the occlusal surface of the assembly 16". The band unit 16" is of generally U-shaped configuration and is provided with the terminal edges or vertical shoulders 60', 62' which are constituted by planar surfaces which are adapted to contact and interfit with the vertical shoulders 38' of the recessed portions 30" and 32", respectively. Similarly, as in band unit 16, band unit 16" has the internal vertical wall surfaces 64" and 66" which are constituted by planar surfaces which abut and fit with the vertical shoulders 40" of the recess portions 30" and 32", respectively, of the tooth unit 24". In addition, the band unit 16″ is provided with the vertical planar corner surfaces or bevelled surfaces 68″ and 70″ which are formed complementary to the vertical corner portions or bevelled surfaces 48″ of the unit 24″ and are similarly adapted to abut the same and interfit therewith. From the foregoing, it will be apparent that, as in the prior embodiments, the band unit 16″ defines a mortise 114 which is complementary to the tenon provided on the tooth body.

The band 16″ is provided with a horizontal shoulder portion or surface 53′ which is complementary to shoulder 52′ of the tooth unit 24′. In addition, pursuant to a feature of the present embodiment, the band unit 16″ is provided at the mesial and distal surfaces thereof with the projections or tongues 94″—94″, which extend below the shoulder 53′ and which are complementary to the recesses in the tooth unit defined by the previously described shoulders or steps 102 extending between the surfaces 104 and 38′, at the mesial and distal surfaces of the tooth unit 24′. Said recesses are indicated by the reference numerals 106 and it will be noted that the projections 94″ are complementary to and adapted to interfit with the recesses 106.

In view of the foregoing, it will be noted that in the assembled condition of the tooth unit 24″ with the band unit 16″ the occlusal surface of the assembly 28′ is constituted solely by the occlusal surface 37′ of the tooth unit 24″ so that the metal of the band 16″ is not visible at all at the occlusal surface of the assembly 28′ and forms no part thereof. In addition, while the primary retention in the lingual to buccal direction is obtained as a result of the provision of the wedge shaped tenon 112 on the tooth body and the complementary mortise 114 in the band, additional retention or locking action in said lingual to buccal direction is effected by the engagement of the projections or tongues 94″ of the band unit 16″ in the recesses 106 defined at the mesial and distal sides of the tooth unit 24″. In addition, while the major support for the biting action is provided by the shoulder support 52′, which extends in a mesial-distal direction, it will be noted that in the present embodiment, addtional shoulder supports or stops for said biting action are provided by the mesial-distal recesses 106 defined in the tooth body 24″. It will be understood that while the posterior tooth assembly 28′ is a molar tooth restoration, the invention herein is fully applicable to the restoration of any tooth, including bicuspid teeth.

With reference to FIGS. 24 through 27, there is shown an anterior tooth and band assembly 90′, which corresponds in all respects to the posterior assembly 28′ described above in detail except in the respects to be pointed out in detail hereinafter. The features described above in detail with reference to the assembly 28′ are applicable to the assembly 90′ except for variations which will be apparent from the description which follows, it being understood that the assembly 90′ is provided with the horizontal interfitting shoulders 52″ and 53″ corresponding to the interfitting shoulders 52′ and 53′ of the assembly 28′. The recesses 106′ defined in the tooth unit 24‴ correspond to the recesses 106 defined in the tooth unit 24″ and the projections or extensions 94‴, 94‴ corresponds to the projections 94″, 94″ and are adapted to interlock in the recesses 106′, respectively. It will therefore be apparent that the anterior restoration tooth and band assembly 90′ comprises a band unit 16‴ having the tooth shaped body 24‴ mounted thereon and supported thereby, said body and band having their interfitting contacting surfaces constituted by planar surfaces in the manner described above in detail so as to provide a restoration assembly 90′ of maximum strength and wherein in addition to the engagement of the interfitting shoulders 52″ and 53″ provision is also made for the interlocking of the extensions 94‴ and 94‴ in recesses 106′, respectively. It will also be noted that the assembly 90′ is devoid of the tongue and groove arrangement of the previously described assembly 90, retention between the band and tooth in the assembly 90′ being obtained in the same manner as in the assembly 28′ namely by the use of interlocking vertically extending surfaces on the tooth and on the band wherein the vertical surfaces on the tooth converge in a lingual to buccal direction and also in an occlusal to gingival direction and the interfitting surfaces on the band are complementary thereto, said surfaces on the tooth body defining a tapered wedge-shaped tenon thereon, and said surfaces on the band defining a complementary mortise therein, as previously described.

Pursuant to an important feature of the present invention, which feature is present in each of the previously described embodiments, it will be noted that the inner surface of each band is a planar surface and that the opposing outer surface thereof is an arcuate surface. For example, as best illustrated in FIGS. 22 and 26, the planar inner surface is indicated at 72′ and the opposing arcuate or outer surface is indicated at 110. I have found that the combination of opposing planar and arcuate surfaces greatly increases the strength of the band by providing a brace effect especially in a mesial-distal direction in comparison with a band having opposing parallel planar or opposing arcuate surfaces. In addition, the utilization of the bevelled inner surface portions, for example as indicated at 68 and 70 in FIG. 10, on the band in each of the embodiments herein greatly increases the strength of the bands at the corners formed by said bevelled portions. Said bevelled surfaces also provide a brace effect at the corners, when compared with a sharp or right angled corner and obviate any possibility of weak or fragile portions which result from the utilization of said sharp or right angled corners.

The present application is a continuation-in-part of my prior application, Serial No. 523,226, filed July 20, 1955, now abandoned.

While I have shown and described the preferred embodiments of my invention, it will be understood that various changes may be made in the idea or principles of the invention within the scope of the appended claims.

Having thus described my invention, what I claim and desire to secure by Letters Patent is:

1. A restoration tooth, comprising a tooth-shaped body adapted to interfit with a complementary supporting band, said body having mesial and distal recessed portions open at the outer lingual side of the tooth and closed at the labial or buccal side thereof, said recessed portions being constituted by planar surfaces extending vertically in a gingival to incisal or occlusal direction and laterally in a mesial-distal direction, and said body having a planar wall at its lingual side extending laterally between said recessed portions and also vertically in a gingival to incisal or occlusal direction, each of said recessed portions comprising a vertical shoulder extending in a mesial-distal direction and a vertical shoulder extending in a labial or buccal-lingual direction, said labial or buccal-lingual shoulders converging towards the gingival edge of said body in a gingival to incisal or occlusal direction and also converging towards the labial or buccal side of said body in a labial or buccal-lingual direction, said last mentioned vertical shoulder and the adjacent edge of said planar wall being interconnected by a planar corner portion disposed at the lingual side of the tooth and extending vertically in a gingival to incisal or occlusal direction.

2. A restoration tooth, comprising a tooth-shaped body adapted to interfit with a complementary supporting band, said body having mesial and distal recessed portions open at the outer lingual side of the tooth and closed at the labial or buccal side thereof, said recessed portions being constituted by planar surfaces extending vertically in a gingival to incisal or occlusal direction and laterally in a mesial-distal direction, and said body having a planar wall at its lingual side extending laterally between said recessed portions and also vertically in a gingival to incisal or occlusal direction, each of said recessed portions comprising a vertical shoulder extending in a mesial-distal direction and a vertical shoulder extending in a labial or bucal-lingual direction, said labial or buccal-lingual shoulders converging towards the gingival edge of said body in a gingival to incisal or occlusal direction and also converging towards the labial or buccal side of said body in a labial or buccal-lingual direction, said lingual planar wall defining the inner lateral boundaries, of said recessed portions, respectively, said recessed portions extending from said gingival edge to the incisal or occlusal edge of said body, said last mentioned vertical shoulder and the adjacent edge of said planar wall being interconnected by a planar corner portion disposed at the lingual side of the tooth and extending vertically in a gingival to incisal or occlusal direction.

3. A restoration tooth, comprising a tooth-shaped body adapted to interfit with a complementary supporting band, said body having mesial and distal recessed portions open at the outer lingual side of the tooth and closed at the labial or buccal side thereof, said recessed portions being constituted by planar surfaces extending vertically in a gingival to incisal or occlusal direction and laterally in a mesial-distal direction, and said body having a planar wall at its lingual side extending laterally between said recessed portions and also vertically in a gingival to incisal or occlusal direction, each of said recessed portions comprising a vertical shoulder extending in a mesial-distal direction and a vertical shoulder extending in a labial or buccal-lingual direction, said labial or buccal-lingual shoulders converging towards the gingival edge of said body in an incisal or occlusal to gingival direction and also converging towards the labial or buccal side of said body in a lingual to labial or buccal direction, said lingual planar wall defining the inner lateral boundaries, of said recessed portions, respectively, said recessed portions extending from said gingival edge to the incisal or occlusal edge of said body, said planar wall extending from the gingival edge of said body and terminating in a planar horizontal shoulder which is spaced from the incisal or occlusal edge thereof, said horizontal shoulder extending between said recessed portions.

4. A restoration tooth and band assembly, comprising a tooth-shaped body mounted on a complementary supporting band, said body having mesial and distal recessed portions open at the outer lingual side of the tooth and closed at the labial or buccal side thereof, said recessed portions being constituted by planar surfaces extending vertically in a gingival to incisal or occlusal direction and laterally in a mesial-distal direction, and said body having a planar wall at its lingual side extending laterally between said recessed portions and also vertically in a gingival to incisal or occlusal direction, each of said recessed portions comprising a vertical shoulder extending in a mesial-distal direction and a vertical shoulder extending in a labial or buccal-lingual direction, said labial or buccal-lingual shoulders converging towards the gingival edge of said body in an incisal or occlusal to gingival direction and also converging towards the labial or buccal side of said body in a lingual to labial or buccal direction, said last mentioned vertical shoulder and the adjacent edge of said planar wall being interconnected by a planar corner portion disposed at the lingual side of the tooth and extending vertically in a gingival to incisal or occlusal direction, said band having vertical inner shoulders interfitting with said vertical body shoulders, respectively, and an inner vertical planar wall interfitting with said body planar wall.

5. A restoration tooth and band assembly, comprising a tooth-shaped body mounted on a complementary supporting band, said body having mesial and distal recessed portions open at the outer lingual side of the tooth and closed at the labial or buccal side thereof, said recessed portions being constituted by planar surfaces extending vertically in a gingival to incisal or occlusal direction and laterally in a mesial-distal direction, and said body having a planar wall at its lingual side extending laterally between said recessed portions and also vertically in a gingival to incisal or occlusal direction, each of said recessed portions comprising a vertical shoulder extending in a mesial-distal direction and a vertical shoulder extending in a labial or buccal-lingual direction, said last mentioned vertical shoulder and the adjacent edge of said planar wall being interconnected by a planar corner portion disposed at the lingual side of the tooth and extending vertically in a gingival to incisal or occlusal direction said labial or buccal-lingual shoulders converging towards the gingival edge of said body in an incisal or occlusal to gingival direction and also converging towards the labial or buccal side of said body in a lingual to labial or buccal direction, said band having vertical inner shoulders interfitting with said vertical body shoulders, respectively, and an inner vertical planar wall interfitting with said body planar wall, said vertical shoulders of said band extending from the incisal or occlusal edge of said body and terminating at the gingival edge thereof, said band having incisal or occlusal surfaces at the mesial and distal sides thereof forming portions of the incisal or occlusal surface of the restoration assembly.

6. A restoration tooth, comprising a tooth-shaped body adapted to interfit with a complementary supporting band, said body having mesial and distal recessed portions open at the outer lingual side of the tooth and closed at the labial or buccal side thereof, said recessed portion being constituted by planar surfaces extending vertically in a gingival to incisal or occlusal direction and laterally in a mesial-distal direction, and said body having a planar wall at its lingual side defining the inner lateral boundaries, of said recessed portions, respectively, and extending vertically in a gingival to incisal or occlusal direction, said planar wall terminating in a planar horizontal shoulder which is spaced from the incisal or occlusal edge of the body, and portions of said body extending from said shoulder in a lingual-labial direction at the mesial and distal sides, respectively of said body, to form terminations for said mesial and distal recessed portions, respectively, said terminations being spaced from the incisal or occlusal edge of the body, and said terminations having recesses defined therein which extend toward the incisal or occlusal edge of the body.

7. A restoration tooth and band assembly comprising a tooth-shaped body mounted on a complementary supporting band, said body having at the lingual side thereof a formation which extends vertically in a gingival to incisal or occlusal direction and which defines a wedge-shaped tenon which tapers in a lingual to labial or buccal direction, said band having defined therein a mortise which is complementary to said tenon so as to provide for the retention of said tooth in said band in a lingual to labial or buccal direction, said tooth body having at the lingual side thereof a shoulder which extends horizontally in a mesial-distal direction and which is spaced from the incisal or occlusal edge of the tooth body, said tenon extending from the gingival edge of said tooth body to said shoulder, and said band having a horizontal edge portion thereof in abutment with said tooth body shoulder, said tenon having bevelled corners and said mortise having complementary surfaces.

8. A restoration tooth and band assembly comprising a tooth-shaped body mounted on a complementary supporting band, said body having at the lingual side thereof a formation which extends vertically in a gingival to incisal or occlusal direction and which defines a wedge-shaped tenon which tapers in a lingual to labial or buccal direction, said band having defined therein a mortise which is complementary to said tenon so as to provide for the retention of said tooth in said band in a lingual to a labial or buccal direction, said tooth body having at the lingual side thereof a shoulder which extends horizontally in a mesial-distal direction and which is spaced from the incisal or occlusal edge of the tooth body, said tenon extending from the gingival edge of said tooth body to said shoulder, and said band having a horizontal edge portion thereof in abutment with said tooth body shoulder, said tooth body having at each of the mesial and distal sides thereof a portion which extends from said shoulder toward the labial or buccal side of said tooth, each of said latter portions having defined therein a recess which is spaced from the incisal or occlusal edge of said tooth body, and said band having at each of the mesial and distal sides thereof a projection which extends vertically in a gingival to incisal or occlusal direction, said projections being complementary to said recesses and engaged therein, respectively.

9. A restoration tooth and band assembly comprising a tooth-shaped body mounted on a complementary supporting band, said body having at the lingual side thereof a formation which extends vertically in a gingival to incisal or occlusal direction and which defines a wedge-shaped tenon which tapers in a lingual to labial or buccal direction, said band having defined therein a mortise which is complementary to said tenon so as to provide for the retention of said tooth in said band in a lingual to labial or buccal direction, said tooth body having at the lingual side thereof a shoulder which extends horizontally in a mesial-distal direction and which is spaced from tthe incisal or occlusal edge of the tooth body, said tenon extending from the gingival edge of said tooth body to said shoulder, and said band having a horizontal edge portion thereof in abutment with said tooth body shoulder, said tooth body having at each of the mesial and distal sides tthereof a portion which extends from said shoulder toward the labial or buccal side of said tooth, each of said latter portions having defined therein a recess which is spaced from the incisal or occlusal edge of said tooth body, and said band having at each of the mesial and distal sides thereof a projection which extends vertically in a gingival to incisal or occlusal direction, said projections being complementary to said recesses and engaged therein, respectively, and the incisal or occlusal edge of said assembly being constituted solely by the incisal or occlusal edge of said tooth body.

10. A restoration tooth and band assembly comprising a tooth-shaped body mounted on a complementary supporting band, said body having at the lingual side thereof a formation which extends vertically in a gingival to incisal or occlusal direction and which defines a wedge-shaped tenon which tapers in a lingual to labial or buccal direction, said band having defined therein a mortise which is complementary to said tenon so as to provide for the retention of said tooth in said band in a lingual to labial or buccal direction, said tooth body having at the lingual side thereof a shoulder which extends horizontally in a mesial-distal direction and which is spaced from the incisal or occlusal edge of the tooth body, said tenon extending from the gingival edge of said tooth body to said shoulder, and said band having a horizontal edge portion thereof in abutment with said tooth body shoulder, said tenon having bevelled corners and said mortise having complementary surfaces, said tenon tapering additionally from said shoulder to the gingival edge of said tooth body and said mortise having a complementary taper.

11. A restoration tooth for a tooth and band assembly comprising a tooth-shaped body having at the lingual side thereof a formation which extends vertically in a gingival to incisal or occlusal direction and which defines a wedge-shaped tenon which tapers in a lingual to labial or buccal direction, said tenon having bevelled corners, said lingual side of said tooth having a groove for receiving the tongue of a complementary supporting band.

12. A restoration tooth and band assembly comprising a tooth-shaped body mounted on a complementary supporting band, said body having at the lingual side thereof a formation which extends vertically in a gingival to incisal or occlusal direction and which defines a wedge-shaped tenon which tapers in a lingual to labial or buccal direction, said band having defined therein a mortise which is complementary to said tenon so as to provide for the retention of said tooth in said band in a lingual to labial or buccal direction, said tenon having bevelled corners and said mortise having bevelled complementary surfaces, said body having at the lingual side thereof a groove, said band having a tongue for mounting in said groove.

References Cited in the file of this patent
UNITED STATES PATENTS

| | | |
|---|---|---|
| 830,887 | Craig | Sept. 11, 1906 |
| 1,433,997 | Frankel | Oct. 31, 1922 |
| 1,435,601 | Hanscom | Nov. 14, 1922 |
| 1,781,908 | Vongunten | Nov. 18, 1930 |
| 2,044,106 | Schwartz | June 16, 1936 |